United States Patent
Diab

(10) Patent No.: US 7,814,346 B2
(45) Date of Patent: Oct. 12, 2010

(54) SYSTEM AND METHOD FOR CONTINUAL CABLE THERMAL MONITORING USING CABLE RESISTANCE CONSIDERATIONS IN POWER OVER ETHERNET

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 635 days.

(21) Appl. No.: 11/684,812

(22) Filed: Mar. 12, 2007

(65) Prior Publication Data

US 2008/0229120 A1    Sep. 18, 2008

(51) Int. Cl.
*G06F 1/00* (2006.01)
(52) U.S. Cl. ...................... 713/300; 340/657
(58) Field of Classification Search ................. 713/300; 340/657
See application file for complete search history.

(56) References Cited

U.S. PATENT DOCUMENTS

| | | | |
|---|---|---|---|
| 6,980,007 B1 * | 12/2005 | Lo et al. | 324/543 |
| 7,457,250 B2 * | 11/2008 | Austermann et al. | 370/241 |
| 7,511,388 B2 * | 3/2009 | Webb et al. | 307/31 |
| 7,536,566 B2 * | 5/2009 | Hemmah et al. | 713/300 |
| 7,593,747 B1 * | 9/2009 | Karam et al. | 455/522 |
| 2005/0262364 A1 * | 11/2005 | Diab et al. | 713/300 |
| 2007/0081553 A1 * | 4/2007 | Cicchetti et al. | 370/466 |
| 2008/0148081 A1 * | 6/2008 | Diab et al. | 713/320 |
| 2008/0170509 A1 * | 7/2008 | Diab et al. | 370/252 |
| 2008/0238634 A1 * | 10/2008 | Diab et al. | 340/310.11 |

* cited by examiner

*Primary Examiner*—Chun Cao
(74) *Attorney, Agent, or Firm*—Duane S. Kobayashi

(57) ABSTRACT

A system and method for continual cable thermal monitoring using cable resistance considerations for Power over Ethernet (PoE) applications. Cable heating in PoE applications is related to the resistance of the cable itself. By periodically monitoring the resistance of the cable, it can be determined whether the cable has exceeded certain operating thresholds. The determined resistance as a proxy for cable heating can then be used in adjusting operational characteristics of PoE channels.

12 Claims, 5 Drawing Sheets

SYSTEM AND METHOD FOR CONTINUAL CABLE THERMAL MONITORING USING CABLE RESISTANCE CONSIDERATIONS IN POWER OVER ETHERNET

BACKGROUND

1. Field of the Invention

The present invention relates generally to network cabling systems and methods and, more particularly, to the continual cable thermal monitoring using cable resistance considerations for power over Ethernet (PoE) applications.

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not it is connected to a valid device to ensure that power is not applied to non-PoE capable devices. After a valid PD is discovered, the PSE can optionally perform a power classification. IEEE 802.3af defines five power classes for a PD device. The completion of this power classification process enables the PSE to manage the power that is delivered to the various PDs connected to the PSE.

This PoE application is a relatively new application that is being applied to an existing cabling infrastructure. Significantly, this cabling infrastructure was not originally designed for the distribution of power. Accordingly, the provision of power over the cabling infrastructure can introduce unintended effects such as heat. This heat can be generated through the transmission of current in the cable itself or in surrounding cables. The dissipation of this heat can be constricted due to physical constraints such as conduits, poor air circulation, etc. PoE systems must account for this heat must be accounted for during operation. These considerations are likely to play an even greater role in the administration of high-power PoE systems such as that proposed by the IEEE 802.3at specification. What is needed therefore is a mechanism that enables the PoE system to account for the existence of heat in the cabling infrastructure in an active manner.

SUMMARY

A system and/or method for continual cable thermal monitoring using cable resistance considerations in PoE, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
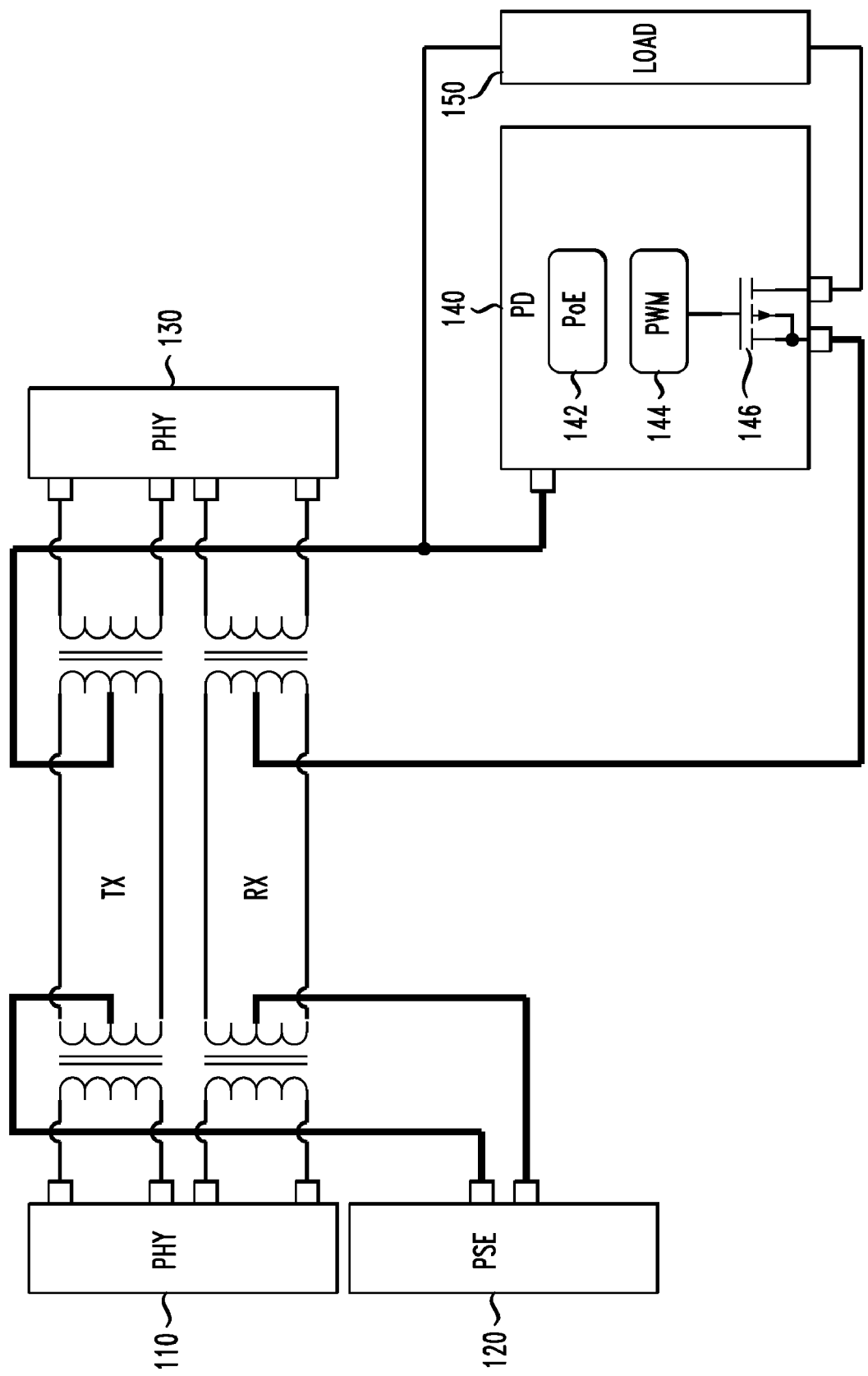
FIG. 1 illustrates an embodiment of a Power over Ethernet (PoE) system.

FIG. 1 illustrates an embodiment of a power over Ethernet (PoE) system. As illustrated, the PoE system includes power source equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. The two TX and RX pairs enable data communication between Ethernet PHYs 110 and 130.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3 at, etc. PD 140 also includes pulse width modulation (PWM) DC:DC controller 144 that controls power FET 146, which in turn provides constant power to load 150.

Figure 2A:
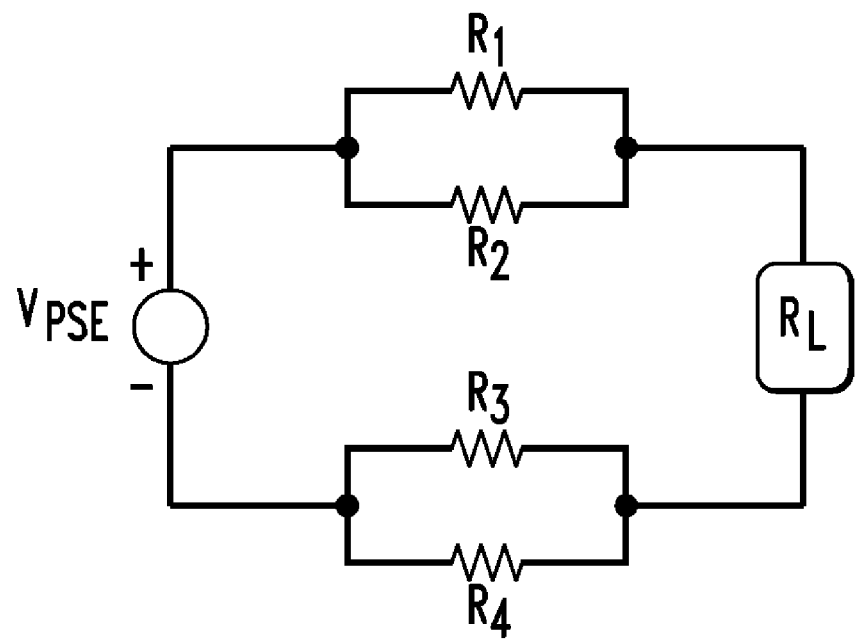
FIGS. 2A and 2B illustrate circuit diagrams that model the PoE system.

The delivery of power from PSE 120 to load 150 can be modeled by the circuit model illustrated in FIG. 2A. As illustrated, a power source provides a voltage ($V_{PSE}$) to a circuit that includes a first parallel pair of resistors ($R_1$, $R_2$), a load resistance ($R_{LOAD}$) and a second parallel pair of resistors ($R_3$, $R_4$). Here, the first parallel pair of resistors ($R_1$, $R_2$) represents the resistances of the TX pair of wires, while the second parallel pair of resistors ($R_3$, $R_4$) represents the resistances of the RX pair of wires.

Figure 2B:
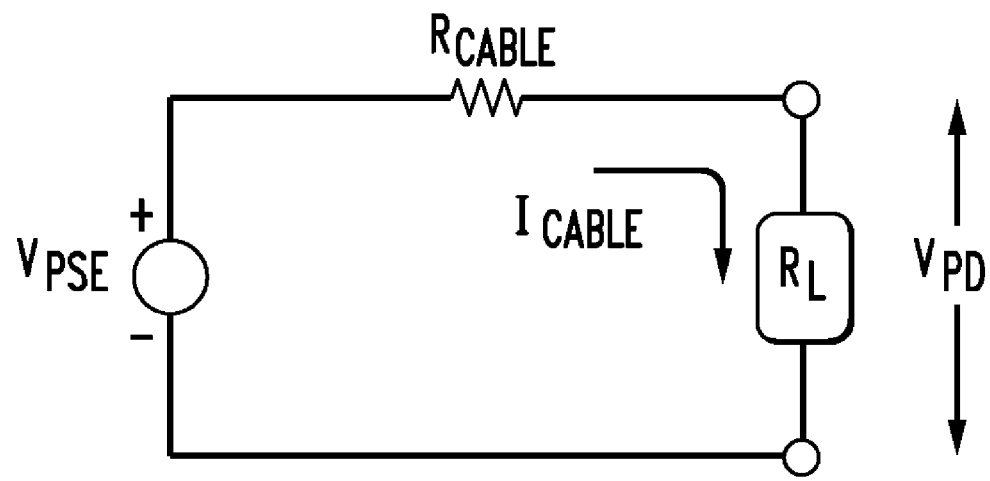

The values of resistors $R_1$, $R_2$, $R_3$, and $R_4$ depend on the type and length of Ethernet cable. Specifically, the resistors $R_1$, $R_2$, $R_3$, and $R_4$ have a certain resistance/length that is dependent on a type of Ethernet cable (e.g., Category 3, 5, 6, etc.). For example, for Category 5/5e Ethernet cable, resistors $R_1$, $R_2$, $R_3$, and $R_4$ would have a resistance of approximately 0.1 Ω/meter. Thus, for a 100-meter Category 3 Ethernet cable, each of resistors $R_1$, $R_2$, $R_3$, and $R_4$ would have a value of 10Ω. In this example, parallel resistors $R_1$ and $R_2$ would have an equivalent resistance of 5Ω, while parallel resistors $R_3$ and $R_4$ would also have an equivalent resistance of 5Ω. In combination, the total value of the cable resistance ($R_{cable}$) can then be determined as the sum of 5Ω+5Ω=10Ω. A simplified PoE circuit model that includes the single cable resistance ($R_{cable}$) is illustrated in FIG. 2B.

In the IEEE 802.3af standard, each wire conductor has a specified current limit of 175 mA, resulting in a total specified current limit of 350 mA. The net effect of the passage of such current through the wire conductor is the generation of heat. This heat can have a significant impact on the operation of the PoE system.

For example, PoE systems can be designed for operation up to an ambient temperature of 45° C. In one example, if a 45° C. ambient temperature is exceeded, the PoE system can be designed to lower the current limit until a 60° C. ambient temperature is reached, at which point power would cease to be applied. These scenarios can occur in typical installations, especially when cables are bundled together. Heat can therefore significantly impact the operation of a PoE system. This impact will be felt to an even greater degree as higher power PoE+ systems, as outlined in the IEEE 802.3 at specification, are introduced.

In higher power PoE+ applications, the first order constraint on how much current can be carried by the cabling system is the amount of heat the system experiences. This results because the heat has a direct effect on safety and the long-term life expectancy of the cable itself. Additionally, excess heat can also lead to the degradation of the data transmission capabilities of the cable. In general, because cabling systems are in very diverse environments, the heating effects can come from a variety of sources: heat generated within the cable itself, the environment temperature, the restriction in airflow in the environment (like conduits), neighboring cabling, etc.

As noted, the bundling of cables can create significant heat issues. For example, it is not uncommon to see massive bundles of cables (e.g., 90-150) leaving a data center or wiring closet. Moreover, conduits that may be within environmental constraints experience very limited airflow, thereby exacerbating the high temperature impact.

One of the concerns of these higher power PoE+ systems is the impact of overly conservative temperature restrictions that are derived from worst-case operating conditions. These overly conservative temperature restrictions can significantly reduce the legitimate operating margins of those PoE+ systems.

It is therefore a feature of the present invention that temperature can be monitored indirectly via resistance on a per port/channel basis to facilitate greater granularity in the monitoring process. This enables the temperature analysis to consider operating conditions on individual ports/channels instead of relying on overly broad measures such as ambient temperature. Indeed, one of the goals of a per port/channel temperature analysis is to ensure that an imposition of a current limitation or power consumption restriction on a port/channel is only performed when necessary, i.e., when heat is actually starting to degrade performance of the cable on that PoE channel.

Figure 3:
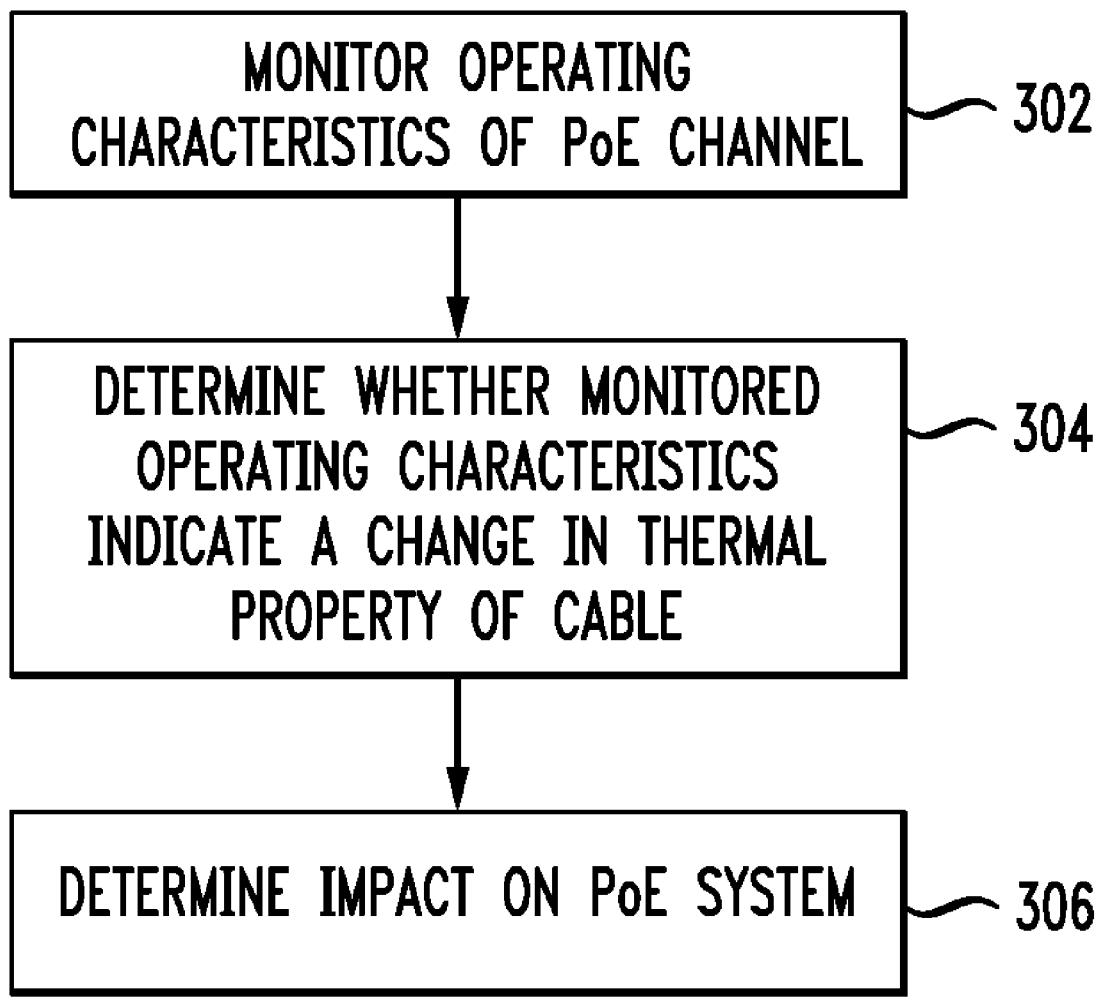
FIG. 3 illustrates a flowchart of a process for monitoring temperature in a PoE system.

To illustrate this general process of the present invention, reference is made to the flowchart of FIG. 3. As illustrated, the process begins at step 302, where one or more operating characteristics of a cable are monitored. In one embodiment, the monitored operating characteristics could include operating voltages and current on a particular PoE channel. These operating characteristics would be measured periodically during the provision of power on the particular PoE channel.

At step 304, it is determined whether the monitored operating characteristics indicate a change in the thermal property of the cable on the PoE channel. As will be described in greater detail below, this analysis can be performed by either the PSE or the PD that is coupled to the PoE channel. In one embodiment, the monitored operating characteristics would enable the PoE system to better estimate the resistance of the cable. In one embodiment, temperature can be directly correlated to resistance using parameters such as the type of cable, length of cable (measured provided by a PHY), and physical equations that govern resistance of a cable based on those parameters. As the resistance of the cable is correlated to the temperature of the cable, the monitoring of the actual cable resistance during active powering of a PD would enable the PoE system to determine whether the thermal characteristic of the cable has changed over time. Monitoring such a change of the cable resistance would thereby enable the PoE system to determine a corresponding change in the temperature of the cable. In other words, the resistance of the cable on a PoE channel is a proxy for the temperature of the cable on that PoE channel.

At step 306, the determined change in temperature of the cable is analyzed to determine a potential impact on the PoE system. In various embodiments, the potential impact could consider a change in operation of a single PoE channel, or a group of PoE channels. For example, if the determined change in temperature indicates that a given cable has reached a temperature that is above an allowable threshold (e.g., 45° C., 60° C., etc.), then the PSE could choose to reduce or cut the power being applied to that PoE channel. In another example, the PSE could choose to reduce or cut the power being applied to a group of PoE channels, if it is known that the heat in a given cable could impact the operation of other cables, for example, where the cables are bundled together. In yet another example, the PD could choose to reduce or cut power consumption if the PD determines that the cable has reached a temperature above an allowable threshold.

As would be appreciated, the particular impact of an identified temperature change of a cable can vary depending on the application. Here, it is a feature of the present invention that the identified temperature change can be determined during operation on a per channel basis and used by the PoE system in a dynamic configuration or operation process.

To illustrate one method for identifying a resistance of the cable, consider the circuit model of FIG. 2B. Across the cable, the voltage drop can be defined as $V_{PSE} = V_{cable} + V_{PD} = I_{cable} * R_{cable} + V_{PD}$. This equation can then be solved for the cable resistance as follows:

$$R_{cable} = (V_{PSE} - V_{PD})/I_{cable}. \quad (1)$$

Figure 4:
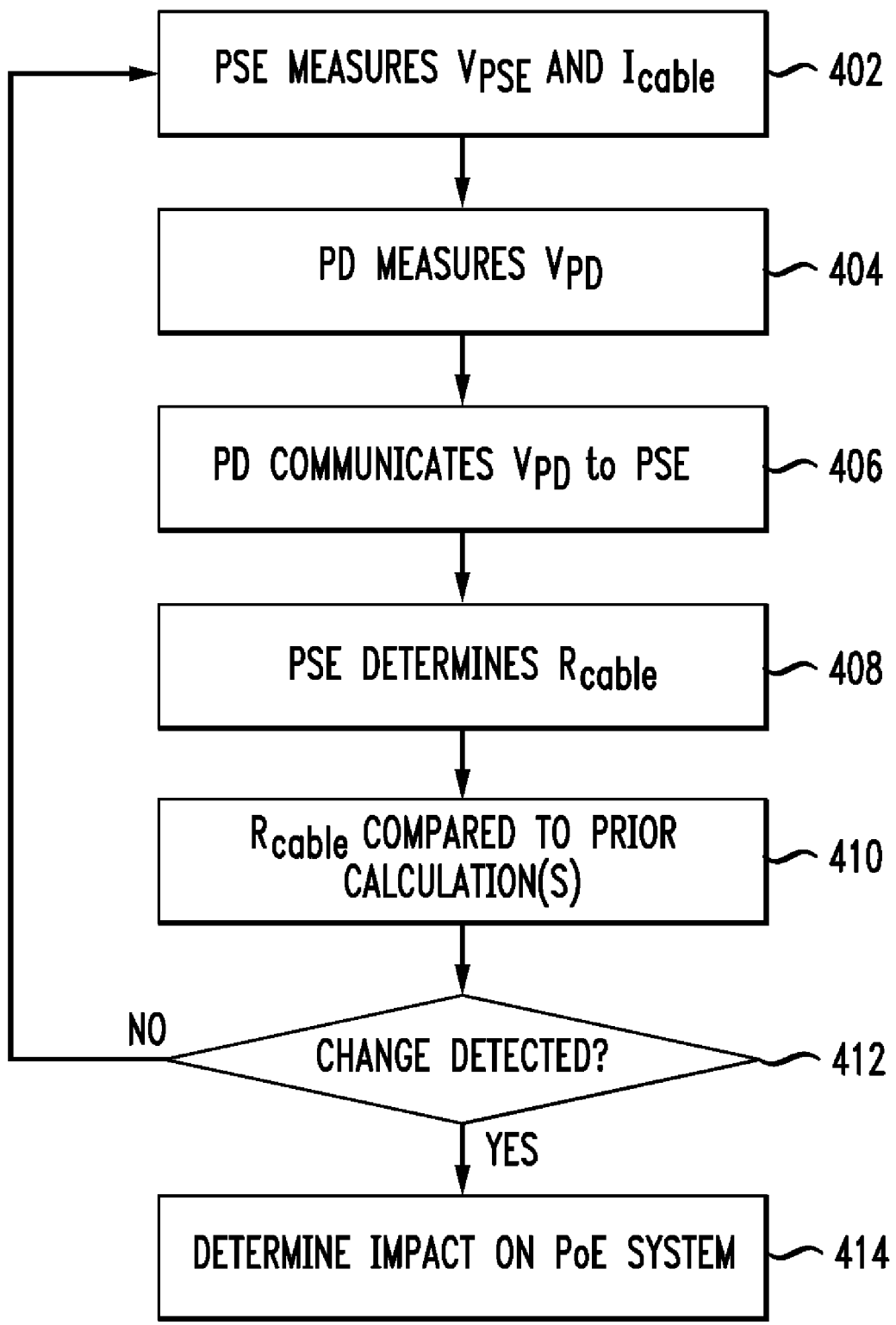
FIGS. 4 and 5 illustrate flowcharts of a process for monitoring temperature in a PoE channel using PSE and PD measurements.

FIG. 4 illustrates a flowchart of an embodiment of monitoring temperature of a cable using equation (1). This process begins at step 402 where the PSE measures $V_{PSE}$ and $I_{cable}$ for a particular PoE channel. It should be noted that this monitoring process can be applied to all active channels of a PSE, although the monitoring for only a single channel is shown in FIG. 4 for simplicity of illustration.

Next, at step 404, the PD measures $V_{PD}$. At this point, the three variables for equation (1) are known and $R_{cable}$ can be determined. In the embodiment of FIG. 4, the calculation of $R_{cable}$ is performed at the PSE. Here, the information measured at the PD would be transmitted to the PSE at step 406. This communication can be performed in a variety of ways. In various implementations, $V_{PD}$ can be communicated to the PSE via Layer 1 (e.g., serially), via Layer 2 packets such as Ethernet, via Layer 3 packets such as IP or any other format, etc. As would be appreciated, the particular choice of communication methodology between the PD and the PSE would be implementation dependent.

After $V_{PD}$ is received at the PSE, the PSE can then calculate $R_{cable}$ at step 408 using Equation (1). Next, at step 410, the value of $R_{cable}$ is compared to prior calculation(s) of $R_{cable}$. In one embodiment, the value of $R_{cable}$ is compared to the previous calculation of $R_{cable}$. In another embodiment, the value of $R_{cable}$ is compared to a baseline calculation such as that generated at or around the onset of powering of the PD. Here, the differential change in resistance could be correlated to the increased heat caused by the PoE system operation. In yet another embodiment, the value of $R_{cable}$ can be analyzed in the context of multiple prior calculations as part of a trend analysis algorithm.

In one embodiment, $R_{cable}$ can be combined with information for the length of the cable. This length information can be measured by the PHY, for example, or presented to the PSE as an input. With the length information, the change in resistance can be normalized per meter or attributed to the length of the channel.

It should be noted that $R_{cable}$ can be used as a proxy for the temperature of the cable. Accordingly, the comparison process of step 410 could alternatively be performed on a calculated variable that is based on $R_{cable}$. For example, if a relation between $R_{cable}$ and the actual temperature of the cable ($T_{cable}$) is known, then the comparison process of step 410 could be performed on the derived variable $T_{cable}$ directly instead of on the proxy $R_{cable}$. This alternative comparison process would be especially valuable where the relation between the variables $R_{cable}$ and $T_{cable}$ was non-linear.

Regardless of the particular methodology of comparison or analysis, at step 412, it is then determined whether a change has been detected. As noted, this change can be measured on the value $R_{cable}$ itself or on another variable derived from $R_{cable}$. If no change is detected at step 412, then the process would loop back where further measurements are taken by the PSE and PD. In this periodic monitoring process, the delay between measurements can be implementation dependent. For example, the delay between measurements can range from fractions of a second to tens of seconds or more. Here, the determined delay can be chosen to provide the system operator with any desired granularity of monitoring.

If a change is detected at step 412, then an impact on the PoE system is determined at step 414. In one embodiment, the determination at step 414 can be based on one or more thresholds that are designed to determine whether the change is significant or not. In one embodiment, a detected change under a predefined threshold could be used to generate an alert that signals that further scrutiny of that port is warranted. For example, the generated alert could dictate that the monitoring frequency of that PoE channel be increased.

In other embodiments, a detected change that exceeds a certain threshold can be designed to produce an action of the operation of that PoE channel. For example, a detected change above a first threshold could lead to certain current limitations being imposed, while a detected change above a second threshold could lead to power being cut off on that channel. As would be appreciated, the specific actions that are taken in response to certain detected changes in step 412 would be implementation dependent.

In one embodiment, the absence of a detected change could also produce a change in the PoE system. For example, if it is determined that no change has been detected, then the PoE system could choose to increase the current threshold on that channel. In other words, the PoE system could choose to dynamically increase the threshold output current on a channel until there are indications that heat has become an issue. In this manner, the PoE system can be designed to increase current thresholds beyond worst-case design specifications.

In one embodiment, a measured change in resistance can be used to calculate a temperature of the cable. For example, assume that the resistance for an unshielded twisted pair moves predictably with temperature such that it changes at approximately 0.022% per degree C. If the resistance is calculated, for example, using length information, then the system can back calculate the temperature of the cable given the measured resistance. The system can then determine what is an allowable increase for PoE given the measured resistance and considering worst-case specifications.

Figure 5:
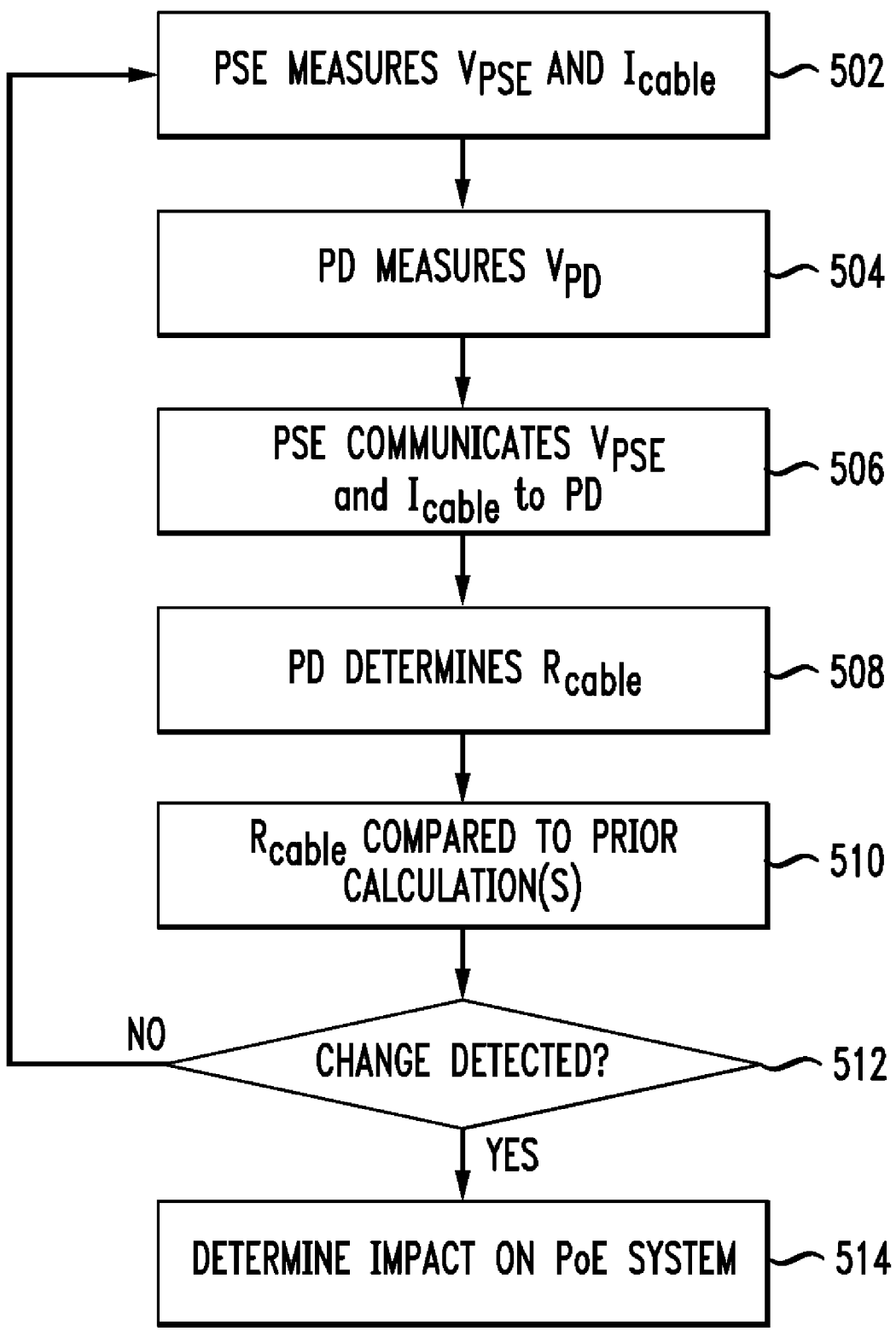

FIG. 5 illustrates a flowchart of another embodiment of monitoring temperature of a cable through analysis at a PD. This process begins at step 502 where the PSE measures $V_{PSE}$ and $I_{cable}$ for a particular PoE channel. Next, at step 504, the PD measures $V_{PD}$. It should be noted that while the PD can alternatively be configured to measure $I_{cable}$, the flowchart of FIG. 5 assumes that the PSE has been given that responsibility.

At this point, the three variables for equation (1) are known and $R_{cable}$ can be determined. As the calculation of $R_{cable}$ is to be performed at the PD, the PSE communicates $V_{PSE}$ and $I_{cable}$ to the PD at step 506. Again, this communication can be performed via Layer 1, Layer 2, Layer 3, etc. After $V_{PSE}$ and $I_{cable}$ are received at the PD, the PD can then calculate $R_{cable}$ at step 508 using Equation (1). Next, at step 510, the value of $R_{cable}$ is compared to prior calculation(s) of $R_{cable}$. As noted above, this comparison can be based on a previous calculation, a baseline calculation, an analysis in the context of multiple prior calculations, a calculated variable based on $R_{cable}$, etc.

At step 512, it is then determined whether a change has been detected. If no change is detected at step 512, then the process would loop back where further measurements are taken by the PSE and PD. If a change is detected at step 512, then an impact on the PoE system is determined at step 514. In one example, a detected change that exceeds a first threshold can lead to a reduction in power consumption by the PD, while a detected change above a second threshold can lead to an elimination of power consumption by the PD. In another example, the absence of a detected change could also produce a change in the PoE system. For example, if it is determined that no change has been detected, then the PD could choose to increase power consumption on that channel. In other words, the PD could choose to dynamically increase the power consumption on a channel until there are indications that heat has become an issue.

It should be noted that the actions taken by the PSE or PD need not be confined to a single channel. While the analysis can be performed on a per channel basis, the subsequent impact can be broader and affect multiple channels. For example, an indication of a high temperature on a first cable could dictate that a second cable would also be at risk, if for example, similarities between the first and second cable existed. The particular types of similarities can range in scope as would be appreciated. For example, it may be known that the first cable is in close proximity to a second cable, such as being in the same conduit. In another example, it may be known that the first and second cable have been operating at similar current levels for a period of time. In general, any basis that would enable the PoE system to infer that a detected heat condition in a first cable could also occur in a second cable would be valuable in determining an impact on PoE system operation.

In general, the principles of the present invention also provide the PoE system with a diagnostic capability. For example, the principles of the present invention can be used to determine whether the cabling system is deteriorating over time. This deterioration would be detectable even if the cabling system is operating within the recommendations of the standard bodies.

One of the benefits of the present invention is that the temperature monitoring does not rely on probes at different points in the cable. Monitoring based on these probe measurements is not sufficient to guarantee that there isn't a problem on a particular section of the cable. For example, the cable may have a "hot spot" in a section of the cable that lies within a hot conduit.

Finally, it should be noted that the principles of the present invention can be applied to any form of network cabling, whether standard Ethernet cabling (e.g., Category 3, 5, 6, etc.) or to non-standard cabling such as Type-II cabling.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method, comprising:
    establishing a current threshold for a delivery of power over an Ethernet cable to a powered device, said current threshold being identified based on an initial static power classification of said powered device;
    periodically receiving operating voltage data from said powered device;
    estimating a resistance of an Ethernet cable that couples said powered device to a power source equipment port using one of said received operating voltage data;
    determining whether a difference between said estimated resistance and a prior estimated resistance is greater than a determination threshold;
    reducing said current threshold for said power source equipment port if it is determined that said difference is greater than said determination threshold; and
    increasing a current threshold for said power source equipment port if it is determined that said difference is not substantial, wherein said increased current threshold enables said powered device to receive a dynamically adjusted amount of power greater than said initial static power classification.

2. The method of claim 1, wherein said estimating comprises calculating $R=(V_{PSE}-V_{PD})/I$, wherein $V_{PSE}$ is a voltage applied to said power source equipment port, $V_{PD}$ is an operating voltage at a powered device, and I is a current through said Ethernet cable.

3. The method of claim 1, wherein said receiving comprises receiving via one of layer 1, layer 2, and layer 3 communication.

4. The method of claim 1, further comprising generating an alert signal if said difference is greater than said threshold.

5. A power over Ethernet method, comprising:
    prior to an allocation of power to a powered device, establishing a current threshold for a delivery of power over said Ethernet cable to said powered device coupled to a power source equipment port, said current threshold being identified base on an initial static power classification of said powered device;
    after allocating power to said powered device, determining a first resistance of said Ethernet cable based on first operating data;
    at a subsequent time, determining a second resistance of said Ethernet cable based on second operating data; and
    increasing a current threshold for said power source equipment port when a comparison of said first resistance and said second resistance indicates an insubstantial change, said increased current threshold dynamically increasing the available power consumption by said powered device beyond said initial static power classification.

6. The method of claim 5, wherein said determining comprises determining a resistance using a powered device voltage, a power source equipment voltage, and a current on said Ethernet cable.

7. A power over Ethernet method in a power source equipment having a first port and a second port, said first port being coupled to a first powered device via a first Ethernet cable, said second port being coupled to a second powered device via a second Ethernet cable, comprising:
    prior to an allocation of power to said first powered device, establishing a first current threshold for a delivery of power to said first powered device;
    prior to an allocation of power to said second powered device, establishing a second current threshold for a delivery of power to said second powered device;
    after allocating power to said first powered device, determining a first resistance of said first Ethernet cable based on first operating data of said first power source equipment port;
    at a subsequent time, determining a second resistance of said first Ethernet cable based on second operating data of said first power source equipment port; and
    determining whether a difference between said first resistance and said second resistance is greater than a threshold;
    reducing said first current threshold for said first power source equipment port and said second current threshold for said second power source equipment port when it is determined that said determined difference is greater than said threshold.

8. The method of claim 7, wherein said determining comprises determining a resistance using a powered device voltage, a power source equipment voltage, and a current on said Ethernet cable.

9. The method of claim 8, further comprising receiving said powered device voltage from said first powered device via one of layer 1, layer 2, and layer 3 communication.

10. The method of claim 7, further comprising generating an alert signal if said difference is greater than said threshold.

11. The method of claim 7, further comprising determining a relationship between said first and second Ethernet cables.

12. The method of claim 11, wherein said first and second Ethernet cables are bundled together.

* * * * *